United States Patent
Garland et al.

(10) Patent No.: US 7,054,433 B1
(45) Date of Patent: May 30, 2006

(54) METHOD AND APPARATUS FOR TRANSMITTING DATA WITHOUT ESTABLISHING A CALL PATH

(75) Inventors: Stuart Mandel Garland, Morton Grove, IL (US); Lila Elizabeth Russ, Plainfield, IL (US); David B. Smith, Hinsdale, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 998 days.

(21) Appl. No.: 09/649,937

(22) Filed: Aug. 29, 2000

(51) Int. Cl.
*G06F 15/16* (2006.01)

(52) U.S. Cl. ............... 379/227; 709/203; 709/228; 379/106.09

(58) Field of Classification Search ............ 709/227, 709/228, 203, 238; 379/106.09; 370/352
See application file for complete search history.

(56) References Cited

U.S. PATENT DOCUMENTS

| | | | | |
|---|---|---|---|---|
| 4,996,685 A * | 2/1991 | Farese et al. | ............... | 370/352 |
| 5,329,619 A * | 7/1994 | Page et al. | .................. | 709/227 |
| 5,359,641 A * | 10/1994 | Schull et al. | .......... | 379/106.09 |
| 5,566,236 A * | 10/1996 | MeLampy et al. | ..... | 379/210.01 |
| 5,579,381 A * | 11/1996 | Courville et al. | ...... | 379/106.09 |
| 5,995,611 A * | 11/1999 | Mowafy et al. | ........ | 379/215.01 |
| 6,203,192 B1 * | 3/2001 | Fortman | .................. | 379/88.14 |
| 6,215,854 B1 * | 4/2001 | Walance | ...................... | 379/21 |
| 6,219,409 B1 * | 4/2001 | Smith et al. | ........... | 379/106.09 |
| 6,286,049 B1 * | 9/2001 | Rajakarunanayake et al. | ........................... | 709/227 |
| 6,373,847 B1 * | 4/2002 | Scoggins et al. | ........... | 709/219 |
| 6,584,074 B1 * | 6/2003 | Vasamsetti et al. | ......... | 370/254 |
| 6,631,118 B1 * | 10/2003 | Jones | ........................ | 370/252 |
| 6,674,746 B1 * | 1/2004 | Lamarque, III | ............. | 370/352 |
| 6,744,867 B1 * | 6/2004 | Chin et al. | ............. | 379/142.01 |

* cited by examiner

*Primary Examiner*—Philip B. Tran
(74) *Attorney, Agent, or Firm*—John B. MacIntyre

(57) ABSTRACT

The present invention provides a method and system for sending a server-specified message from an application server to Customer Premises Equipment (CPE) without setting up a call path between the application server and the CPE. The application server is coupled with a switch, which is in turn coupled with the CPE. The application server sends a request to the switch. The switch sends, based upon the request, a predetermined server-specified message to the CPE without setting up a call path between the application server and the CPE. The CPE is not rung and the predetermined message is not affected by the features of the line associated with the CPE.

15 Claims, 2 Drawing Sheets

US 7,054,433 B1

METHOD AND APPARATUS FOR TRANSMITTING DATA WITHOUT ESTABLISHING A CALL PATH

FIELD OF THE INVENTION

The present invention relates generally to communication systems, and more particularly to a method and apparatus for accessing customer premises equipment without establishing a call path.

BACKGROUND OF THE INVENTION

Setting up a suppressed ringing connection to access customer premises equipment (CPE) entails accessing the CPE by suppressing the normal alerting signal to the customer so that the customer is not induced to try to answer the call. Typically, normal terminating features for the customer, such as call forwarding and call waiting, are bypassed for this suppressed ringing connection. The suppressed ringing connection typically uses frequency shift keying (FSK) or tone signals to perform an alerting function for the analog or digital customer premises equipment with which it may communicate in either the off-hook or on-hook mode. Communication can be initiated by a server, or the CPE can respond to the server. The communication takes place without disturbing the customer or being affected by customer features, over the same loop that is used for customer telephone conversations.

Trunks are preferably special purpose trunks, such as utility telemetry trunks, which are capable of establishing suppressed ringing connections over the public switched telephone network with a CPE. Trunks are useful for digital or analog communication.

After determining how many lines are available for a connection, the server initiates a suppressed ringing connection to the additional lines. Preferably, a no ring access is made to a CPE regardless of the features assigned to the line. For example, a connection is made to the user's line in spite of call forwarding features, call blocking features, or vacation service. The suppressed ringing connection is preferably indicated to the telephone network implicitly based on the trunk employed by the server to place the call, or alternately based on an indication made during call set up. To initiate the calls over a special trunk for suppressed ringing, the server goes off-hook and seizes the suppressed ringing trunk and outpulses the required set-up data, including a destination number and optional billing number. If the user's line is not busy, a connection is cut through. Once the server receives acknowledgement from the switch that the connection is cut through, the customer premises equipment is alerted, for example by a frequency shift keying data stream, a single or dual tone, or other alerting method.

In current suppressed ringing connections, a call path is set up and maintained between the server and the CPE. This consumes switch resources, while only using the actual customer line for short periods of time. There is a need to minimize switch resources when a telemetry call is placed to a CPE.

Therefore, a need exists for a method and apparatus that is able to communicate information with customer premises equipment without alerting the user, without setting up a call path to the customer premises equipment, and that is not affected by features of the line to which customer premises equipment is connected.

SUMMARY OF THE INVENTION

The present invention provides an expanded data communications transport service that allows a variety of new data or voice services using the functionality of the existing basic suppressed ringing data call setup. These new data services are delivered using non-call path associated data communications capabilities. As used herein, the term call path refers to a circuit switched call associated path. In the preferred embodiment, an application server sends a predefined short burst of fixed data to the switch. The switch then determines a message associated with this predefined short burst of data, and sends this associated message to the CPE. In this embodiment, the message is generated by the switch based upon a predetermined message or identifier sent from the application server. The application server could also send a code that is translated by the CPE, using a table look up methodology.

In the alternate embodiment, the application server generates a message and sends the message to the switch. The switch then forwards this message to the CPE without establishing a call path. In this embodiment, the application server sends a short block of data, which may include an alert sequence, to the switch. The switch then transmits this message to the CPE. Upon receipt, the switch may provide error correction before forwarding the message, such as out of range, unrecognized data, data exceeding the character limits, or other types of errors.

The system configuration of the present invention is preferably a switch comprising a "5ESS", "7R/E", and "1A ESS" data communications platform available from "LUCENT TECHNOLOGIES", Murray Hill, N.J. The switch allows a service provider, using normal switch functionality, to obtain a no-ring connection to a CPE regardless of the features that have been assigned to the CPE. For example, a connection is made to the CPE if the end user has invoked call forwarding, call blocking, has been disconnected for non payment, or has invoked vacation service. Communications to the CPE is provided when the CPE presents line appearance to the switch, such as when the CPE is serviced through normal loops or loops containing integrated, remote, or concentrated Digital Loop Carrier (DLC) equipment. Multiple applications may use the basic suppressed ringing transport capability.

The present invention thereby provides a mechanism for sending data from an application server to a CPE without setting up a call path between the server and the CPE, and without being effected by the features of the line associated with the CPE. The present invention thereby provides for faster communication with a CPE while utilizing fewer system resources, since a call path is not established for the communication.

DESCRIPTION OF THE PREFERRED EMBODIMENT(S)

Figure 1:
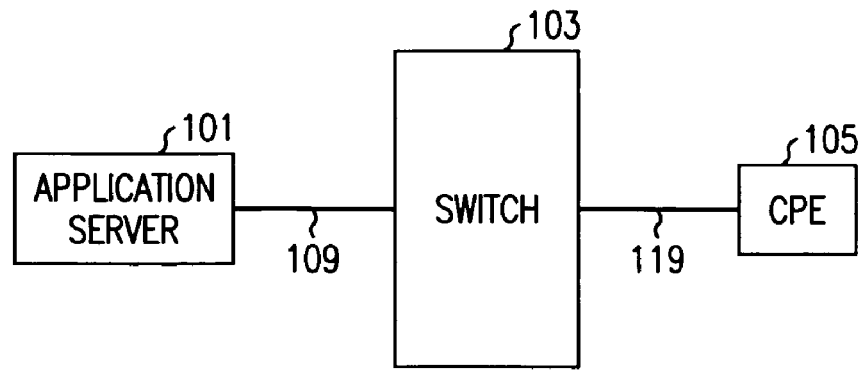
FIG. 1 depicts a communication system that includes an application server, a switch and customer premises equipment (CPE) in accordance with the preferred embodiment of the present invention.

FIG. 1 depicts a communication system 100 that includes an application server 101, a switch 103, and customer premises equipment (CPE) 105 in accordance with the preferred embodiment of the present invention. Communication system 100 is effective in sending predetermined messages to CPE 105 without setting up an end-to-end call path between application server 101 and CPE 105.

Communication system 100 includes application server 101 directly connected to switch 103. Application server 101 is preferably connected to a plurality of switches, although only one is shown in FIG. 1 for clarity. Application server 101 initiates, through direct trunking or CCS7, a communication with CPE 105 that does not ring CPE 105, is not affected by the features of the line to which CPE 105 is connected and does not require a call path to be set up between application server 101 and CPE 105. Communication system 100 may include a server termination switch and a customer termination switch.

In the preferred embodiment as depicted in FIG. 1, switch 103 comprises both server termination switch and customer termination switch. In this embodiment, application server 101 and CPE 105 are directly coupled to switch 103 via trunks 109 and line 119. Alternately, application server 101 can be connected to switch 103 via lines, and CPE 105 can be connected to switch 103 via subscriber lines. In the embodiment depicted in FIG. 1, connections between application server 101 and CPE 105 are made directly by a single telecommunications switch 103.

Application server 101 preferably comprises a computer. Application server 101 is preferably connected to the switches using connection 109. Connection 109 is preferably a T1 connection, but can alternately be a fractional T1 connection, an E1 connection, analog trunks, or other digital facilities. In the preferred embodiment, an expanded suppressed ringing trunk protocol is used on the trunk facility to present the destination telephone number and other parameters to switch 103. In an alternate embodiment, a modified BRI/PRI protocol element is used on the trunk facility to convey the required information. In the preferred embodiment of the present invention, the non-call path associated call is of short duration and no server or end user actions are specified to stop the transmission of data to CPE 105. The end user of the CPE preferably maintains precedence over the line, so should there be a conflict on using the line, the CPE should prevail.

Switch 103 is effective in receiving a request from application server 101. Switch 103 is a telecommunications switch that terminates lines to subscribers and couples those lines to the public switched telephone network. Switch 103 is preferably a "5Ess" switch available from "LUCENT TECHNOLOGIES", Murray Hill, N.J.

In the preferred embodiment, switch 103 sends, based upon the server request, a predetermined message to CPE 105 without setting up an end-to-end call path between CPE 105 and application server 101. In the alternate embodiment, switch 103 forwards the server request to CPE 105. In either embodiment, the message sent from switch 103 to CPE 105 is not affected by features assigned to the line associated with CPE 105. Switch 103 also is effective in receiving a return message from CPE 105 without setting up a call path between application server 101, switch 103, and CPE 105. Switch 103 sends a status message based upon the return message to application server 101. Switch 103 is described in more detail in FIG. 2 below.

CPE 105 is preferably located at a customer's premises, and in the preferred embodiment comprises a telephone. CPE 105 can alternately comprise a modem, a computer, a data communications terminal, or any data communications equipment available at a customer premises.

Figure 2:
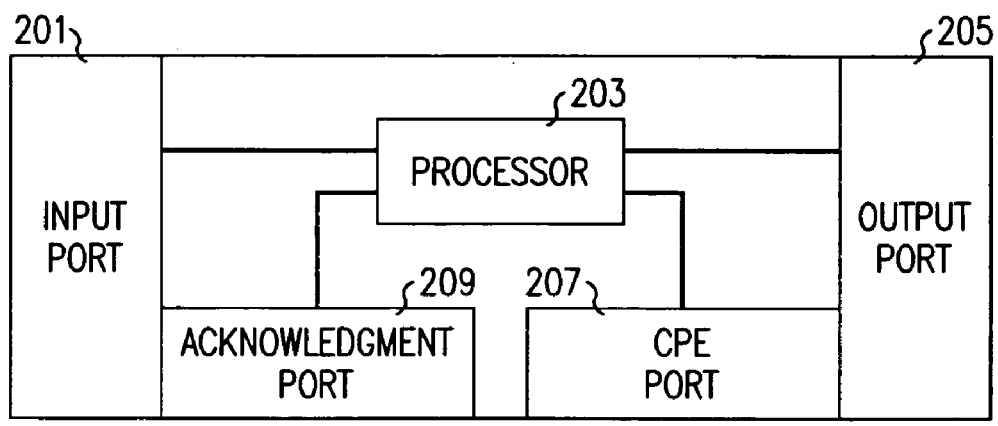
FIG. 2 depicts the switch of FIG. 1 in accordance with the preferred embodiment of the present invention.

FIG. 2 depicts switch 103 of FIG. 1 in accordance with the preferred embodiment of the present invention. Switch 103 preferably comprises an input port 201, a processor 203, an output port 205, CPE port 207, and acknowledgement port 209.

Input port 201 is effective in receiving a request from an application server. In the preferred embodiment, the request is a message that is interpreted by processor 203. Processor 203 sends a message to the CPE based upon this message received from the application server. In an alternate embodiment of the present invention, the message received from the application server is forwarded to the CPE via output port 205 without being interpreted by processor 203.

Processor 203 is effective in determining the type of message based upon the request received from the application server. In the preferred embodiment, processor 203 receives a predefined short burst of fixed data from the application server. Processor 203 determines a message associated with this predefined short burst of data and translates and sends this associated message to CPE 105 over output port 205. In this preferred embodiment, the message is generated by switch 103 based upon a predetermined message sent from application server 101. Alternately, switch 103 can forward the message to CPE 105, and CPE 105 can translate the message.

In the alternate embodiment, application server 101 generates a message and sends the message to switch 103. The message is received at switch 103 at input port 201. Switch 103 forwards this message to CPE 105. In this alternate embodiment, application server 101 sends a short block of data, which may include an alert sequence, to switch 103, which is received at input port 201. Switch 103 then transmits this message to CPE 105. In this embodiment, the message is forwarded to CPE 105 without setting up an end-to-end call path between application server 101 and CPE 105 through switch 103.

Output port 205 is effective in sending, responsive to the type of request, a predetermined message to a CPE coupled to switch 103 through a network. The predetermined message is sent to the CPE without setting up an end-to-end call path. As used herein, the term end-to-end call path refers to a call path between the application server, the switch and the CPE. Additionally, the predetermined message is not affected by features switch 103 has assigned to the line of the CPE. Output port 205 is effective in sending a message utilizing suppressed ringing capabilities to CPE 105.

CPE port 207 is effective in receiving a return message from CPE 105 without setting up a call path between application server 101 and CPE 105.

Acknowledgement port 209 is effective in sending a status message from switch 103 to application server 101. The status message is based upon the return message.

Output port 205 and CPE port 207 can be located in the same physical device. Similarly, input port 201 and acknowledgement port 209 can be located in the same physical device.

Figure 3:
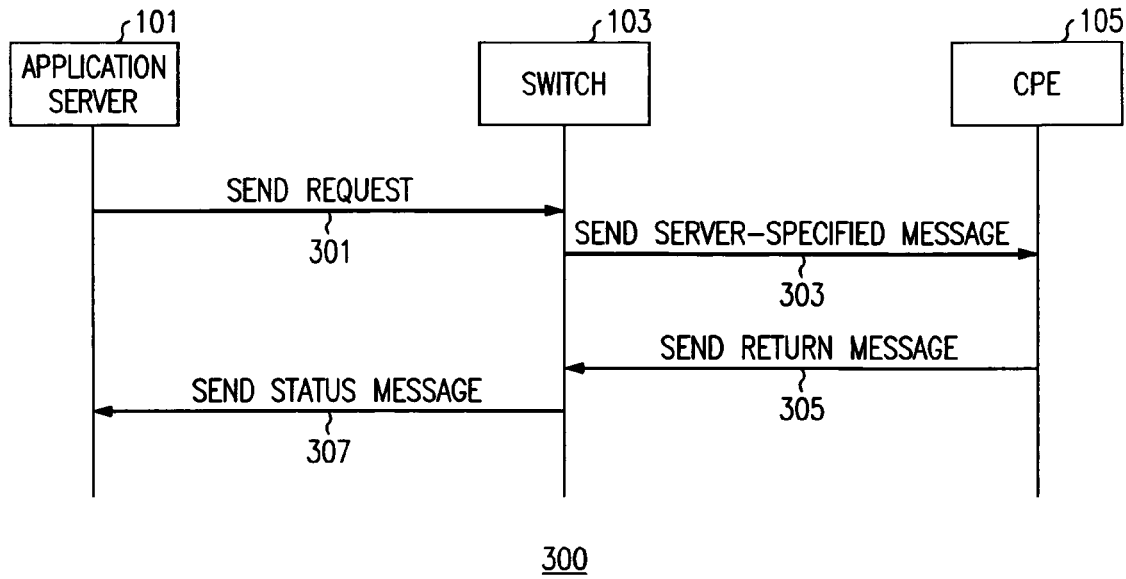
FIG. 3 depicts a ladder diagram of a method for sending a server-specified message to the CPE without setting up a call path between the application server and the CPE in accordance with the preferred embodiment of the present invention.

FIG. 3 depicts a ladder diagram 300 of a method for sending a server-specified message to CPE 105 without setting up a call path between application server 101 and CPE 105 in accordance with the preferred embodiment of the present invention. Ladder diagram 300 includes application server 101, switch 103, and CPE 105. In this embodiment, application server 101 sends a request to switch 103, which sends a message to CPE 105 based upon the request received from application server 101.

Application server 101 sends a request 301 to switch 103. Request 301 preferably is included in a set of predetermined messages, such that switch 103 can determine a message associated with request 301 to send to CPE 105.

Message 301 is preferably a message that includes a command code and a data portion. The command code preferably comprises a predefined sequence that the application server, switch, and CPE recognize. For example, the command code can be "01", which represents a storm warning for a particular geographic region. The data portion can include a directory number, a list of directory numbers, or a code that represents a predefined list of directory numbers. With the above example, the data portion can be a code that represents the directory phone numbers of all lines that are located within a geographic region, such as a county. In this example, upon determining that a storm is approaching, the application server sends a message to the switch. The message includes a "storm code" and a county code. The storm code, such as 01, indicates to the switch that a particular message should be sent to the specified users. The specified users are identified by the county code, which is in the data portion of the message. Switch 103 then determines all lines of houses or businesses that are located within the specified county. Switch 103 then sends the predefined storm warning messages to all of the lines within the county.

The present invention provides enhanced functionality in such a scenario in multiple ways. First, because an end-to-end call path is not set up between application server 101 and CPE 105, system resources are not utilized. Because of this, the throughput for emergency messages is effectively increased. Further, the message is sent to CPEs attached to the lines regardless of the features of the CPE. For example, even if CPE 105 has initiated call forwarding, the emergency message will still be sent to CPE 105. If service has been discontinued, the emergency message will be sent to CPE 105, if the loop facilities are in place. Further, if the phone is off-hook or in any other way not operational for receiving a telephone call, the emergency message can still be received by CPE 105. If alerting is outside of the voice band, the end user will not hear the alert message or data.

Switch 103 sends, based upon request 301, a predetermined server-specified message 303 to CPE 105 without setting up a call path between application server 101 and CPE 105. This is preferably accomplished by bridging onto the existing call, by opening an analog path to send predetermined server-specified message 303 to CPE 105. CPE 105 is not rung and delivery of predetermined message 303 is not affected by the features of CPE 105. As an example, if CPE 105 has invoked call forwarding, this message will not be forwarded to the assigned device to which other calls are forwarded, but will be delivered to CPE 105.

CPE 105 sends a return message 305 to switch 103 without setting up a call path between application server 101 and CPE 105. Return message 305 is an acknowledgement, a reset message, a data message, or the like, and indicates whether the message was received by CPE 105.

Switch 103 sends a status message 307 based upon return message 305 to application server 101 without setting up a call path between application server 101 and CPE 105. Status message 307 conveys the status of the message delivery to CPE 105.

The present invention thereby provides suppressed ringing functionality without requiring a suppressed ringing connection. Data delivery is possible regardless of the status of the CPE, as long as the CPE is capable of receiving the message. Data can be sent and received to the CPE when the line associated with the CPE is turned off, when call forwarding has been activated, or when vacation service has been activated. The present invention accomplished this with reduced call setup time and with fewer system resources necessary to transmit and receive the data.

Figure 4:
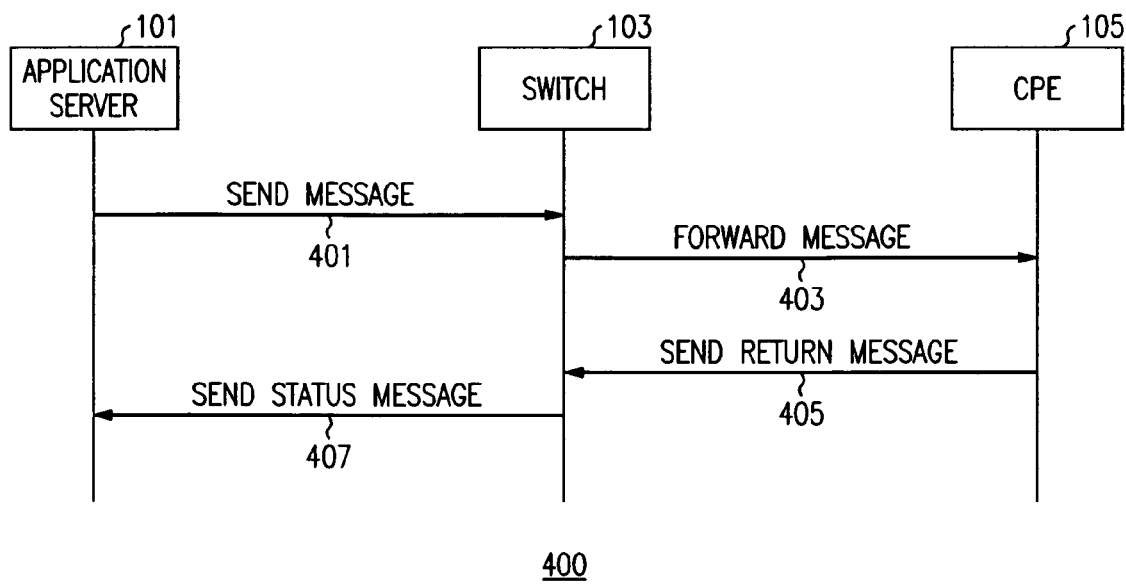
FIG. 4 depicts a ladder diagram of a method for sending a server-specified message to the CPE without setting up a call path between the application server and the CPE in accordance with the alternate embodiment of the present invention.

FIG. 4 depicts a ladder diagram 400 of a method for sending a server-specified message to CPE 105 without setting up a call path between application server 101 and CPE 105 in accordance with the alternate embodiment of the present invention. Ladder diagram 400 includes application server 101, switch 103, and CPE 105. In this embodiment, application server 101 sends a message to switch 103, which forwards the message to CPE 105.

Application server 101 sends a message 401 to switch 103. Application server 101 can send this message to switch 103 by utilizing one of the four predefined alert techniques: Tones, FSK, Ringing, or No Alert. The alert could be a no alert message, a single tone message, a dual tone message, a sequence of tones, FSK modulation (such as TR30 on-hook, off-hook), regular ringing, distinctive ringing, or Ping Pong (sending ping, stopping ping, and reporting failure).

Switch 103 forwards message 403 to CPE 105 without setting up a call path between application server 101 and CPE 105. This is preferably accomplished by opening an analog path to send the predetermined server-specified message to CPE 105. CPE 105 is not rung and message 403 is not affected by the features of CPE 105. As an example, if CPE 105 has invoked the call blocking feature, the message will still be delivered to CPE 105.

For example, switch 103 can transmit to CPE 105 10 bytes of FSK data. Alternately, switch 103 can play to CPE 105 a tone sequence in Dual-Tone Multi-Frequency (DTMF) or other non alert tones or perform an interaction with CPE 105, such as repetitive functions such as ping pong tones between switch 103 and CPE 105 or call back a predefined directory number.

CPE 105 preferably sends a return message 405 to switch 103 without setting up a call path between application server 101 and CPE 105. Return message 405 can be a predefined CPE response, such as accepting a tone or short FSK response from the CPE, or a predefined disposition of CPE Response, such as sending the CPE response to the application server or other specified directory number.

Switch 103 sends a status message 407 based upon the return message to application server 101 without setting up a call path between application server 101 and CPE 105.

In this manner, the alternate embodiment of the present invention provides fast transmission to multiple CPEs in minimal time and with minimal switch traffic. By forwarding messages from an application server to a CPE, greater flexibility in messaging is achieved, while utilizing a relatively small amount of system resources.

The present invention provides a non-call path associated data communications capability to the existing suppressed ringing platform. The expanded functionality is preferably provided through additional fields in the Intelligent Pathway trunk protocol or a new parameter block in BRI/PRI.

In the preferred embodiment of the present invention, the application server sends a request to the switch. Processing is performed and the alert, command, or data is output in fixed, predefined format toward a CPE. The switch assumes that the on hook CPE is capable of receiving whatever message is sent to it. The CPE may respond, and the switch can either pass the response to the application server or accept the response at the switch.

In the alternate embodiment of the present invention, the application server sends a block of data to the switch. The data is not acted upon by the switch but is output to the CPE as received. As in the preferred embodiment, the switch assumes that the on hook CPE is capable of receiving whatever message is sent to it. The CPE may respond to the message, and the response is preferably passed back to the application server. No response may indicate the lack of data delivery. In this case, the application server is notified that no response was received by the switch.

Utilizing the present invention provides the capability of transmitting a message or command to a CPE device in a much more rapid time frame than by utilizing a call associated communications path. Additionally, fewer system resources are utilized, since less telephone and switch capacity is used during the communications.

The data payload delivery occurs without the CPE device end user being present, without the CPE device being rung by the switch, by connecting to the CPE device even when the phone line has been forwarded, disconnected for non-payment, or assigned any other service redirecting features, and without a call path being established between the application server, the switch, and the CPE.

Examples of applications that can be performed utilizing the present invention include lighting an indicator on the CPE as an indicator, such as that a voice message, FAX message, or email message is waiting, sending short data messages to a CPE, issuing commands to the CPE, such as requests for a callback or a check on the status of a user of the CPE, and distinctive line ringing of the CPE.

While this invention has been described in terms of certain examples thereof, it is not intended that it be limited to the above description, but rather only to the extent set forth in the claims that follow.

The embodiment of this invention in which an exclusive property or privilege is claimed are defined as follows.

We claim:

1. In a communication system including a switch coupled with Customer Premises Equipment (CPE) and an application server coupled with the switch, a method for sending a server-specified message to the CPE without setting up a call path between the application server and the CPE, the method comprising the steps of:

sending a request from the application server to the switch;

sending, based upon the request, a predetermined server-specified message from the switch to the CPE without setting up a call path between the application server and the CPE, wherein the CPE is not rung and the predetermined server-specified message is not affected by features of the CPE;

sending a return message from the CPE to the switch without setting up a call path between the application server and the CPE; and sending a status message based upon the return message from the switch to the application server without setting up a call path between the application server and the CPE.

2. A method for sending a message in accordance with claim 1, wherein the step of sending a predetermined server-specified message from the switch to the CPE comprises the step of forwarding the request received from the application server to the CPE.

3. A method for sending a message in accordance with claim 1, wherein the step of sending a predetermined server-specified message from the switch to the CPE comprises the step of opening an analog path to send the predetermined server-specified message to the CPE.

4. A switch comprising:

means for receiving a request from an application server;

means for determining the type of Customer Premises Equipment (CPE) message based upon the request;

means, responsive to the type of message, for sending a predetermined server-specified message to a Customer Premises Equipment (CPE) coupled to the switch without setting up a call path between the application server and the CPE, wherein the predetermined server-specified message is not affected by features assigned to the CPE;

means for receiving a return message from the CPE to the switch without setting up a call path between the application server and the CPE; and means for sending a status message based upon the return message from the switch to the application server without setting up a call path between the application server and the CPE.

5. A switch in accordance with claim 4, wherein the means for sending the predetermined server-specified message to the CPE comprises means for forwarding the request from the application server to the CPE without setting up a call path between the application server and the CPE.

6. A switch in accordance with claim 4, wherein the means for sending a predetermined message to the CPE comprises means for sending a message to the CPE using suppressed ringing capabilities.

7. A switch comprising:

an input port effective in receiving a request from an application server;

a processor effective in determining the type of message based upon the request;

an output port effective in sending, responsive to the type of request, a predetermined server-specified message to a Customer Premises Equipment (CPE) coupled to the switch without setting up a call path between the application server and the CPE wherein the predetermined server-specified message is not affected by features of the CPE;

a CPE port effective in receiving a return message from the CPE without setting up a call path between the application server and the CPE; and an acknowledgment port effective in sending a status message based upon the return message from the switch to the application server without setting up a call path between the application server and the CPE.

8. A switch in accordance with claim 7, wherein the output port is effective in sending a message utilizing suppressed ringing capabilities to the CPE.

9. A communication system for sending predetermined messages to Customer Premises Equipment (CPE) without setting up an end-to-end call path, the communication system comprising:

an application server;

a Customer Premises Equipment (CPE); and a switch coupled to the application server and the CPE, the switch effective in receiving a request from the application server and effective in sending, based upon the request, a predetermined server-specified message to the CPE without setting up an end-to-end call path between the CPE and the application server, wherein the predetermined server-specified message is not affected by features of the CPE, the switch further being effective in receiving a return message from the CPE without setting up a call path between the application server and the CPE, the switch further being effective in sending a status message based upon the return message from the switch to the application server without setting up a call path between the application server and the CPE.

10. A communication system in accordance with claim 9, wherein the switch is effective in forwarding the request from the application server to the CPE.

11. A communication system in accordance with claim 9, wherein the CPE comprises a modem.

12. A communication system in accordance with claim 9, wherein the CPE comprises a computer.

13. A communication system in accordance with claim 9, wherein the CPE comprises a data communications terminal.

14. A communication system in accordance with claim 9, wherein the application server comprises a computer.

15. A communication system in accordance with claim 9, wherein the application server comprises a data communications device.

\* \* \* \* \*